(12) United States Patent
Noui et al.

(10) Patent No.: US 11,614,631 B1
(45) Date of Patent: Mar. 28, 2023

(54) ADAPTIVE VIEWPORTS FOR A HYPERFOCAL VIEWPORT (HVP) DISPLAY

(71) Applicant: META PLATFORMS TECHNOLOGIES, LLC, Menlo Park, CA (US)

(72) Inventors: Louahab Noui, Hartfield (GB); Adrian Stannard, St Leonards-On-Sea (GB)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/570,012

(22) Filed: Jan. 6, 2022

Related U.S. Application Data

(63) Continuation of application No. 16/709,787, filed on Dec. 10, 2019, now Pat. No. 11,221,494.

(60) Provisional application No. 62/777,474, filed on Dec. 10, 2018.

(51) Int. Cl.
  *G02B 27/01* (2006.01)
  *G06F 3/01* (2006.01)

(52) U.S. Cl.
  CPC ..... *G02B 27/0179* (2013.01); *G02B 27/0172* (2013.01); *G06F 3/013* (2013.01); *G02B 2027/0187* (2013.01)

(58) Field of Classification Search
  None
  See application file for complete search history.

(56) References Cited

U.S. PATENT DOCUMENTS

| 3,121,992 A | 2/1964 | Friiz et al. |
| 4,220,400 A | 9/1980 | Vizenor |
| 4,232,943 A | 11/1980 | Rogers |

(Continued)

FOREIGN PATENT DOCUMENTS

| CN | 106164743 A | 11/2016 |
| EP | 0785457 A2 | 7/1997 |

(Continued)

OTHER PUBLICATIONS

Aye T.M., "Miniature Guided Light Array Sequential Scanning Display for Head Mounted Displays," Final Report to US Army CECOM, Fort Monmouth, NJ, May 15, 1998, 35 Pages, Retrieved from the Internet: URL: http://handle.dtic.mii/100.2/ADA350745, 35 pages.

(Continued)

*Primary Examiner* — Chad M Dicke
(74) *Attorney, Agent, or Firm* — Weaver Austin Villeneuve & Sampson LLP

(57) ABSTRACT

Optical adaptive viewport display systems and methods are provided. One such optical adaptive viewport display system has an adaptive pupil device which is optical coupled to an optical combiner. The adaptive pupil device is optically couplable to an image projector and is configured to select a sub-pupil from the pupil of the projector. The selected sub-pupil is optically relayed by relay optics from the adaptive pupil device to an eyebox. The relay optics includes an optical combiner. The sub-pupil size and position is selected by the adaptive pupil device so that an optical image spot beam from the sub-pupil and reflected by the optical combiner on to the eye box has a diameter at the eyebox such that the virtual image, as seen by a human eye disposed at the eyebox, is hyperfocused.

20 Claims, 8 Drawing Sheets

(56) References Cited

U.S. PATENT DOCUMENTS

| | | | |
|---|---|---|---|
| 4,545,646 A | 10/1985 | Chern et al. |
| 4,767,186 A | 8/1988 | Bradley, Jr. et al. |
| 4,968,117 A | 11/1990 | Chern et al. |
| 5,050,946 A | 9/1991 | Hathaway et al. |
| 5,076,664 A | 12/1991 | Migozzi |
| 5,202,950 A | 4/1993 | Arego et al. |
| 5,253,637 A | 10/1993 | Maiden |
| 5,535,025 A | 7/1996 | Hegg |
| 5,848,119 A | 12/1998 | Miyake et al. |
| 5,886,822 A | 3/1999 | Spitzer |
| 5,896,438 A | 4/1999 | Miyake et al. |
| 5,959,726 A | 9/1999 | Riley et al. |
| 5,991,085 A | 11/1999 | Rallison et al. |
| 6,057,966 A | 5/2000 | Carroll et al. |
| 6,157,291 A | 12/2000 | Kuenster et al. |
| 6,204,974 B1 | 3/2001 | Spitzer |
| 6,222,677 B1 | 4/2001 | Budd et al. |
| 6,236,511 B1 | 5/2001 | Brown |
| 6,262,019 B1 | 7/2001 | Keller et al. |
| 6,288,846 B1 | 9/2001 | Stoner, Jr. |
| 6,353,503 B1 | 3/2002 | Spitzer et al. |
| 6,563,648 B2 | 5/2003 | Gleckman et al. |
| 6,577,311 B1 | 6/2003 | Crosby et al. |
| 6,607,286 B2 | 8/2003 | West et al. |
| 6,671,100 B1 | 12/2003 | McRuer |
| 6,714,174 B2 | 3/2004 | Suyama et al. |
| 6,829,095 B2 | 12/2004 | Amitai |
| 6,926,420 B2 | 8/2005 | Sung |
| 7,059,728 B2 | 6/2006 | Alasaarela et al. |
| 7,079,318 B2 | 7/2006 | Shikama et al. |
| 7,209,097 B2 | 4/2007 | Suyama et al. |
| 7,336,244 B2 | 2/2008 | Suyama et al. |
| 7,418,202 B2 | 8/2008 | Biernath et al. |
| 7,446,943 B2 | 11/2008 | Takagi et al. |
| 7,506,987 B2 | 3/2009 | Nilsen |
| 7,513,674 B1 | 4/2009 | Donahue |
| 7,576,916 B2 | 8/2009 | Amitai |
| 7,639,208 B1 | 12/2009 | Ha et al. |
| 7,656,585 B1 | 2/2010 | Powell et al. |
| 7,686,497 B2 | 3/2010 | Kropac et al. |
| 7,688,347 B2 | 3/2010 | Dolgoff |
| 7,703,931 B2 | 4/2010 | Nilsen |
| 7,710,655 B2 | 5/2010 | Freeman et al. |
| 7,876,489 B2 | 1/2011 | Gandhi et al. |
| 7,936,519 B2 | 5/2011 | Mukawa et al. |
| 7,944,616 B2 | 5/2011 | Mukawa |
| 7,991,257 B1 | 8/2011 | Coleman |
| 8,384,999 B1 | 2/2013 | Crosby et al. |
| 8,964,292 B1 | 2/2015 | Marason et al. |
| 8,988,463 B2 | 3/2015 | Stone Perez et al. |
| 9,252,015 B2 | 2/2016 | Wu et al. |
| 9,720,232 B2 | 8/2017 | Hua et al. |
| 10,007,115 B2 | 6/2018 | Greenhalgh et al. |
| 10,191,993 B2 | 1/2019 | Ross et al. |
| 10,481,678 B2 | 11/2019 | Crispin |
| 10,488,666 B2 | 11/2019 | Leighton et al. |
| 10,623,722 B2 | 4/2020 | Markovsky et al. |
| 10,649,209 B2 | 5/2020 | Leighton et al. |
| 10,795,434 B2 | 10/2020 | Crispin |
| 11,262,580 B1 * | 3/2022 | Topliss | G02B 26/101 |
| 2001/0021239 A1 | 9/2001 | Itoga et al. |
| 2001/0033440 A1 | 10/2001 | Togino |
| 2002/0021461 A1 | 2/2002 | Ono et al. |
| 2002/0070904 A1 | 6/2002 | Okuyama |
| 2003/0169397 A1 | 9/2003 | Reichow et al. |
| 2003/0184868 A1 | 10/2003 | Geist |
| 2004/0207823 A1 | 10/2004 | Alasaarela et al. |
| 2005/0094292 A1 | 5/2005 | Cahall et al. |
| 2006/0119794 A1 | 6/2006 | Hillis et al. |
| 2006/0132914 A1 | 6/2006 | Weiss et al. |
| 2007/0008624 A1 | 1/2007 | Hirayama |
| 2007/0177275 A1 | 8/2007 | McGuire, Jr. |
| 2008/0151185 A1 | 6/2008 | Saito et al. |
| 2009/0051879 A1 | 2/2009 | Vitale et al. |
| 2009/0167651 A1 | 7/2009 | Minano et al. |
| 2010/0103078 A1 | 4/2010 | Mukawa et al. |
| 2010/0149073 A1 | 6/2010 | Chaum et al. |
| 2010/0278480 A1 | 11/2010 | Vasylyev |
| 2010/0290127 A1 | 11/2010 | Kessler et al. |
| 2010/0321409 A1 | 12/2010 | Komori et al. |
| 2011/0007277 A1 | 1/2011 | Solomon |
| 2011/0050655 A1 | 3/2011 | Mukawa |
| 2011/0083741 A1 | 4/2011 | Munro |
| 2011/0083742 A1 | 4/2011 | Munro |
| 2011/0155331 A1 | 6/2011 | Lopin |
| 2011/0157600 A1 | 6/2011 | Lyon |
| 2011/0213664 A1 | 9/2011 | Osterhout et al. |
| 2011/0221656 A1 | 9/2011 | Haddick et al. |
| 2011/0226332 A1 | 9/2011 | Ford et al. |
| 2011/0227813 A1 | 9/2011 | Haddick et al. |
| 2011/0255303 A1 | 10/2011 | Nichol et al. |
| 2011/0286222 A1 | 11/2011 | Coleman |
| 2012/0002294 A1 | 1/2012 | Dobschal et al. |
| 2012/0002295 A1 | 1/2012 | Dobschal et al. |
| 2012/0019662 A1 | 1/2012 | Maltz |
| 2012/0147038 A1 | 6/2012 | Perez et al. |
| 2013/0147686 A1 | 6/2013 | Clavin et al. |
| 2013/0235191 A1 | 9/2013 | Miao et al. |
| 2013/0242392 A1 | 9/2013 | Amirparviz et al. |
| 2014/0153102 A1 | 6/2014 | Chang |
| 2014/0361957 A1 | 12/2014 | Hua et al. |
| 2015/0205126 A1 | 7/2015 | Schowengerdt |
| 2016/0109708 A1 | 4/2016 | Schowengerdt |
| 2016/0154244 A1 | 6/2016 | Border et al. |
| 2016/0270656 A1 | 9/2016 | Samec et al. |
| 2016/0327789 A1 | 11/2016 | Klug et al. |
| 2016/0343164 A1 | 11/2016 | Urbach et al. |
| 2017/0147859 A1 * | 5/2017 | Zhang | H04N 5/2352 |
| 2017/0332726 A1 | 11/2017 | Markovsky et al. |
| 2018/0011322 A1 | 1/2018 | Leighton et al. |
| 2018/0045960 A1 | 2/2018 | Palacios et al. |
| 2018/0113311 A1 | 4/2018 | Klug et al. |
| 2018/0189568 A1 * | 7/2018 | Powderly | G06T 19/006 |
| 2018/0267309 A1 * | 9/2018 | Klug | G02B 27/0988 |
| 2018/0308455 A1 | 10/2018 | Hicks et al. |
| 2018/0348524 A1 | 12/2018 | Blum et al. |
| 2020/0049998 A1 | 2/2020 | Leighton et al. |
| 2020/0183152 A1 | 6/2020 | Pennell et al. |
| 2020/0183174 A1 | 6/2020 | Noui et al. |
| 2020/0225400 A1 | 7/2020 | Stannard |
| 2020/0233218 A1 | 7/2020 | Leighton et al. |
| 2020/0278553 A1 | 9/2020 | Leighton et al. |
| 2021/0055788 A1 | 2/2021 | Crispin |
| 2021/0080730 A1 * | 3/2021 | Morrison | G06T 19/006 |

FOREIGN PATENT DOCUMENTS

| | | |
|---|---|---|
| EP | 1798592 A2 | 6/2007 |
| EP | 1736812 B1 | 4/2010 |
| EP | 3355315 A1 | 8/2018 |
| KR | 20180041224 A | 4/2018 |
| RU | 2069835 C1 | 11/1996 |
| TW | I271580 B | 1/2007 |
| WO | 02099509 A1 | 12/2002 |
| WO | 2007014371 A2 | 2/2007 |
| WO | 2007019138 A1 | 2/2007 |
| WO | 2007062098 A2 | 5/2007 |
| WO | 2008109420 A2 | 9/2008 |
| WO | 2008110942 A1 | 9/2008 |
| WO | WO-2009048562 A1 | 4/2009 |
| WO | 2010033859 A2 | 3/2010 |
| WO | 2010062481 A1 | 6/2010 |
| WO | 2010106248 A1 | 9/2010 |
| WO | 2010123934 A1 | 10/2010 |
| WO | 2011124897 A1 | 10/2011 |
| WO | 2011130715 A2 | 10/2011 |
| WO | 2018009885 A1 | 1/2018 |
| WO | 2018166006 A1 | 9/2018 |
| WO | WO-2018220625 A1 | 12/2018 |
| WO | 2020123018 A1 | 6/2020 |

(56) References Cited

FOREIGN PATENT DOCUMENTS

| | | |
|---|---|---|
| WO | 2020123561 A1 | 6/2020 |
| WO | 2020146683 A1 | 7/2020 |

OTHER PUBLICATIONS

Combined Search and Examination Report under Sections 17 and 18(3) of UK Patents Act 1977, dated May 8, 2012 for G.B. Patent Application No. 1200312.6, 3 pages.
Decision on Petition dated Aug. 27, 2020 for U.S. Appl. No. 16/739,103, filed Jan. 9, 2020, 2 Pages.
Extended European Search Report for European Application No. 19897273.9, dated Jan. 19, 2022, 10 pages.
Final Office Action dated Aug. 8, 2019 for U.S. Appl. No. 15/893,599, filed Feb. 10, 2018, 24 Pages.
Final Office Action dated Feb. 19, 2019 for U.S. Appl. No. 15/206,111, filed Jul. 8, 2016, 27 Pages.
Final Office Action dated Jan. 31, 2019 for U.S. Appl. No. 15/893,599, filed Feb. 10, 2018, 30 Pages.
International Preliminary Report on Patentability for International Application No. PCT/US2019/065551, dated Jun. 24, 2021, 11 Pages.
International Search Report and Written Opinion for International Application No. PCT/US2016/041588, dated Oct. 24, 2016, 32 Pages.
International Search Report and Written Opinion for International Application No. PCT/US2017/041228, dated Nov. 2, 2017, 14 Pages.
International Search Report and Written Opinion for International Application No. PCT/US2019/055198, dated Jan. 9, 2020, 6 Pages.
International Search Report and Written Opinion for International Application No. PCT/US2019/065551, dated Feb. 21, 2020, 12 Pages.
International Search Report and Written Opinion for International Application No. PCT/US2020/012995, dated May 19, 2020, 11 Pages.
Nicholas D., et al., Corresponding GB Patent Application GB1200321.6 Specification and Drawings, filed Jan. 9, 2011, at UK Intellectual Property Office, to Cerr Limited, 46 Pages.
Non-Final Office Action dated Feb. 3, 2020 for U.S. Appl. No. 16/596,648, filed Oct. 8, 2019, 36 Pages.
Non-Final Office Action dated Nov. 3, 2017 for U.S. Appl. No. 15/206,111, filed Jul. 8, 2016, 8 Pages.
Non-Final Office Action dated Oct. 3, 2018 for U.S. Appl. No. 15/404,172, filed Jan. 11, 2017, 41 Pages.
Non-Final Office Action dated Aug. 10, 2017 for U.S. Appl. No. 14/825,148, filed Aug. 12, 2015, 36 Pages.
Non-Final Office Action dated Mar. 15, 2018 for U.S. Appl. No. 15/206,111, filed Jul. 8, 2016, 20 Pages.
Non-Final Office Action dated Apr. 24, 2020 for U.S. Appl. No. 16/658,078, filed Oct. 19, 2019, 54 Pages.
Notice of Allowance dated Jan. 22, 2021 for U.S. Appl. No. 16/214,142, filed Dec. 10, 2018, 17 Pages.
Office Action dated Mar. 1, 2016 for U.S. Appl. No. 14/825,148, filed Aug. 12, 2015, 11 Pages.
Page K., et al., "Pattern Formation in Spatially Heterogeneous Turing Reaction-Diffusion Models," Physica D [online], 2003, vol. 181, pp. 80-101, Retrieved from the Internet: URL: https://people.maths.ox.ac.uk/maini/PKM%20publications/152.pdf, 23 pages.
Office Action dated Jan. 3, 2023 for Chinese Application No. 201980091761.3, filed Aug. 10, 2021, 12 pages.

* cited by examiner

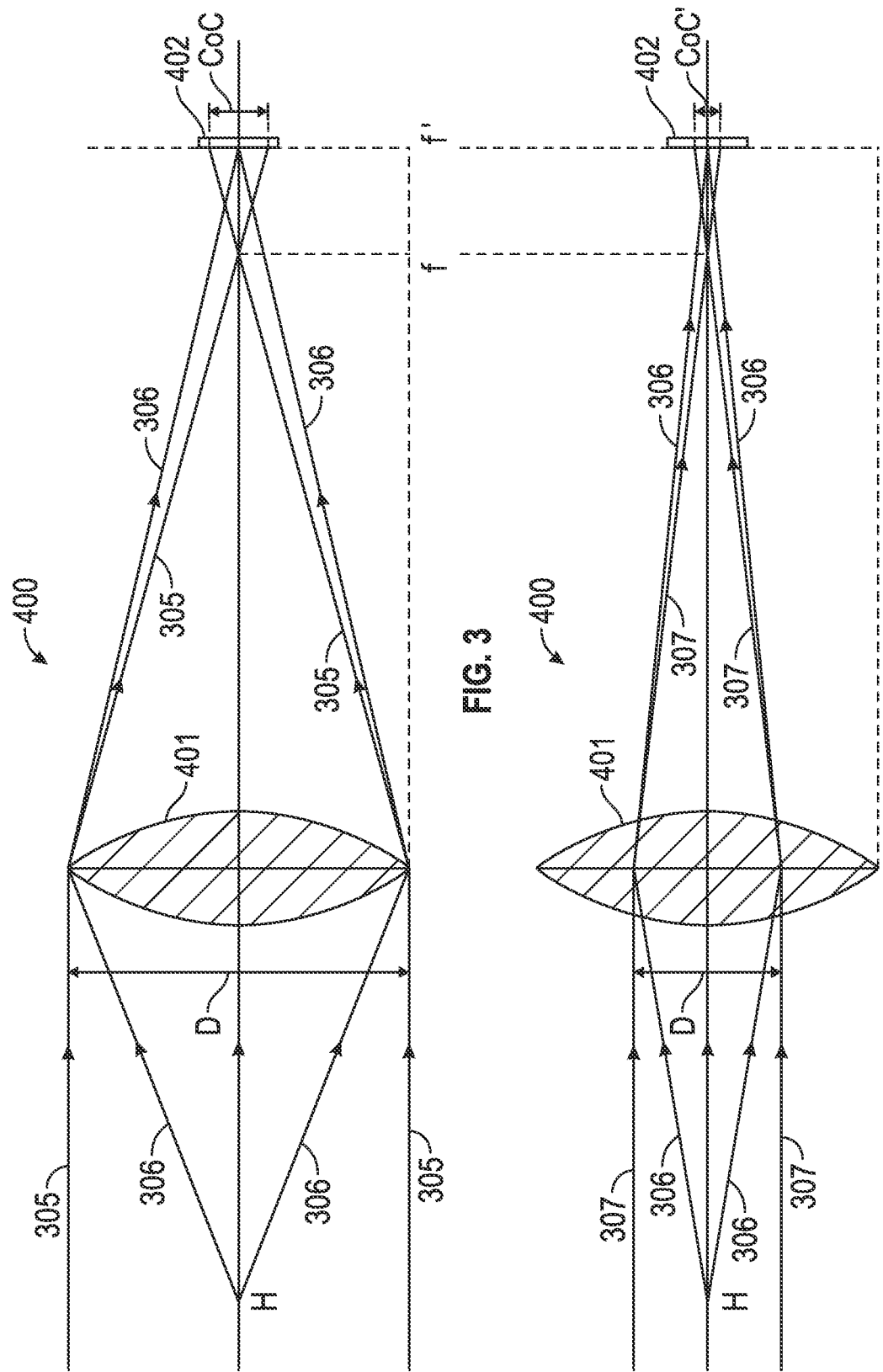

ADAPTIVE VIEWPORTS FOR A HYPERFOCAL VIEWPORT (HVP) DISPLAY

CROSS REFERENCE TO RELATED APPLICATIONS

This application is a continuation of, and claims priority to, U.S. patent application Ser. No. 16/709,787, filed Dec. 10, 2019, and entitled "ADAPTIVE VIEWPORT OPTICAL DISPLAY SYSTEMS AND METHODS", which claims the benefit of U.S. Provisional Application No. 62/777,474, filed Dec. 10, 2018, and entitled "ADAPTIVE VIEWPORTS FOR A HYPERVOCAL VIEWPORT (HVP) DISPLAY". The entire contents of the patent applications identified above is incorporated by reference herein as if fully set forth.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments relate to optical systems, and more particularly but not exclusively, to optical systems for augmented reality systems and/or virtual reality optical displays. Some embodiments relate to optical systems for delivering virtual display image views to the human eye in augmented reality imaging systems and/or virtual reality imaging systems. Some embodiments relate to optical methods, and more particularly but not exclusively, to optical methods for augmented reality systems and/or virtual reality optical displays. Some embodiments relate to optical methods for delivering virtual display image views to the human eye in augmented reality imaging systems and/or virtual reality imaging systems. Some embodiments relate to augmented and/or virtual reality displays incorporating the aforementioned optical systems and methods associated therewith.

BACKGROUND

Some users of virtual reality (VR) and augmented reality (AR) systems experience eye strain and fatigue resulting in an uncomfortable viewing experience.

Accommodation and vergence conflict in AR and VR displays is becoming a serious hinderance in using these over extended times. It is well known that users complain of headaches and sickness after extended use of VR displays for instance. There has been a lot of research activities to try to address this issue.

There is a need to provide systems that can be used in virtual reality and/or augmented reality displays to at least alleviate the problems of eye strain and fatigue.

SUMMARY

According to one aspect, an optical display system is provided. The optical display system may comprise an adaptive pupil device locatable at the pupil of a projection system. The adaptive pupil device may comprise a digital display device. The digital display device may be configured to select a sub-area of the pupil of the projection system to thereby provide a sub-pupil of the projection system for relaying to a user's eye. The digital display device may be configured to control the selection of the size and the position of the sub-pupil. Relay optics may be arranged in optical communication between the digital display device and an eye box. The digital display device may be configured to select the size and the position of the sub-pupil such that the sub-pupil, when relayed by the relay optics on to a user's eye at the eye box, corresponds to a single viewport through which the projected virtual image is viewable by the user's eye in focus beyond the hyperfocal distance.

In some embodiments, the relay optics comprises an optical combiner. The optical combiner may be a free space optical combiner. The digital display device may comprise a micro display panel. The micro display panel may comprise micro-electrical-mechanical system (MEMS), Digital Micromirror device (DMD) or Liquid crystal on silicon (LCoS) or other type of display.

The optical display system may further comprise an eye tracking and sensing device configured to monitor the gaze angle and pupil size of the user's eye at the eyebox.

The digital display device may be configured to select the corresponding size and position of the sub-pupil of the projection system in response to the monitored gaze angle and eye pupil size such that the projected virtual image is viewable by the user's eye in focus beyond the hyperfocal distance for different gaze angles and eye pupil sizes. A processor may be included in or associated with the adaptive pupil device and may be configured to calculate the size and position of the sub-pupil at the adaptive pupil device in response to the processor receiving gaze angle and/or pupil size signals from the eye tracking and sensing device. Such signals may be transmitted between the eye tracking and sensing device and the adaptive pupil device wirelessly or via a wired connection between the devices. The tracking and sensing device may include a processor and eye tracking cameras for determining the eye gaze angle and eye pupil size.

In some embodiments, the digital display device may comprise a micro display panel. The micro display panel may be configured to steer the projected image beam.

The relay optics may be configured to introduce optical power to the system so that the location of the projected image can be varied to produce multiple focal planes.

The optical system may comprise a head mounted display in which the image projector, adaptive pupil display, relay optics and eyetracking and sensing devices and associated processors are incorporated.

According to another aspect, an optical method may comprise selecting, by a digital display device located at the pupil of a projection system, a sub-area of the pupil of the projection system to thereby provide a sub-pupil of the projection system; relaying, by optics arranged in optical communication between said digital display device and an eye box, the sub-pupil to the eye box; and wherein the step of selecting, by a digital display device located at the pupil of a projection system, the sub-area of the pupil of the projection system comprises selecting the size and position of the sub-pupil projections system such that the sub-pupil relayed to the eyebox corresponds to a single viewport through which a virtual image projected from the projector system is viewable in focus beyond the hyperfocal distance by a user's eye at the eyebox.

The step of relaying, by optics arranged in optical communication between said digital display device and an eye box, the sub-pupil to the eye box; may comprise relaying the sub-pupil to the eye box via an optical combiner and other relay optics, as necessary.

The optical combiner may be a free space optical combiner.

The digital display device may comprise a micro display panel.

The micro display panel may comprise an micro-electrical-mechanical system (MEMS), Digital Micromirror device (DMD) or Liquid crystal on silicon (LCoS).

The optical method may further comprise monitoring, by an eye tracking and sensing device, the gaze angle and pupil size of the user's eye at the eyebox.

The optical method may further comprise dynamically selecting the corresponding size and position of the sub-pupil of the projection system in response to monitoring the gaze angle and eye pupil size such that the projected virtual image is viewable by the user's eye in focus beyond the hyperfocal distance for different gaze angles and eye pupil sizes.

The digital display device may comprise a micro display panel, and steering, by the micro display panel, the projected image beam.

The optical method may further comprise introducing optical power to the relay optics so that the location of the projected image can be varied to produce multiple focal planes.

According to another aspect, an optical display system for augmented and/or virtual reality system is provided. The optical display system may comprise an adaptive pupil device locatable at the pupil of a projection system. The adaptive pupil device may comprise a digital display device. The digital display device may be configured to select a sub-area of the pupil of the projection system to thereby provide a sub-pupil of the projection system for relaying onto a target area of a lens-detector system. The digital display device may be configured to control the selection of the size and the position of the sub-pupil. The relay optics maybe arranged in optical communication between the digital display device and an eye box.

The digital display device may be configured to select the size and the position of the sub-pupil such that the sub-pupil, when relayed by said relay optics on to a target area of a lens-detector, corresponds to single viewport through which the projected virtual image is viewable by the lens-detector in hyperfocus.

In some embodiments, the target area may be a target area for a human eye and the view of the projected virtual image observable by the human eye locatable at the target area is hyperfocused.

In any one of the aforementioned aspect and/or embodiments, the optical combiner may be partially or substantially transparent to optical rays of a real world image received through a face of the optical combiner facing away from the eye target area.

In any one of the aforementioned aspect and/or embodiments, the system may be a binocular system in which a first one of the aforementioned optical systems is configured for a left eye target area of the binocular display system; and further comprising a second one of the aforementioned optical systems being configured for the right eye target area of the binocular system.

The first optical system and the second optical system may be spaced from the left eye target area and the right eye target area such that a vergence plane of the binocular system is located in the optical range from infinity down to the hyperfocal distance of the left eye lens and the right eye lens.

Any one of the aforementioned aspects and/or embodiments of the optical system may be configured and as an augmented or virtual reality display system, such as a head mounted display.

The augmented or virtual reality display system may be a head up display.

The augmented or virtual reality display system may be a near eye display.

According to another aspect, there is provided an optical and electronic display system. The system may comprise any one of the optical systems mentioned hereinbefore or hereinafter; at least one processor; and at least one eye tracking camera operably coupled to the processor, the eye tracking camera(s) being configured to monitor the eye at the eye target area; wherein the processor is operably coupled to the adaptive pupil device; and wherein the processor is configured to cause the adaptive pupil device to select a sub-pupil of the projections system of a size and position to form a hyperfocused human eye view of the virtual display image according to the monitoring of the eye.

The eye tracking camera(s) may be configured to monitor the gaze direction of the eye at the eye target area; wherein the processor may be configured to cause the adaptive pupil device to vary or modify dynamically the selection of the required sub-pupil position and size according to an eye tracking value corresponding to the gaze direction being monitored by the eye tracking camera.

The eye tracking camera may be arranged in an indirect view configuration.

The eye tracking camera may be arranged in a direct view configuration.

According to yet another aspect, an apparatus is provided. The apparatus may comprise: a memory storing instructions; and one or more processors, wherein the instructions, when processed by the one or more processors, cause: eye tracking with an eye tracking camera the gaze direction of an eye observing a virtual image relayed by the optical combiner of any one of the aforementioned optical systems; selecting with the adaptive pupil device a size and position of the sub-pupil according to the eye tracking to generate a hyperfocused human eye view of the virtual display image.

According to yet another aspect, a computer-readable medium is provided. The computer-readable medium may include contents that are configured to cause a processor to perform a method comprising: determining from an eye tracking camera the gaze direction of an eye and/or size of the pupil of the eye of the observer of a virtual image relayed by an optical combiner of any one of the aforementioned optical systems; modifying or varying the sub-pupil size and position provided by the adaptive pupil device according to the gaze direction and/or eye pupil size such that virtual image remains hyperfocused and viewable through a single viewport.

INCORPORATION BY REFERENCE

All publications mentioned herein are incorporated herein by reference to disclose and describe the apparatus, methods and/or materials in connection with which the publications are cited. All publications, patents, and patent applications mentioned in this specification are herein incorporated by reference in their entirety and for all purposes to the same extent as if each individual publication, patent, or patent application was specifically and individually indicated to be incorporated by reference.

The publications discussed or mentioned herein are provided solely for their disclosure prior to the filing date of the present application. Nothing herein is to be construed as an admission that the present invention is not entitled to antedate such publication by virtue of prior invention.

BRIEF DESCRIPTION OF THE DRAWINGS

In order that the present invention may be more readily understood, reference will now be made to the accompanying drawings, in which:

FIG. 3 is a simple geometric optical ray diagram illustrating a circle of confusion rendered by a lens on an optical detector;

FIG. 4 is a simple geometric optical ray diagram illustrating how the circle of confusion shown in FIG. 3 has been adjusted;

DETAILED DESCRIPTION OF PREFERRED EMBODIMENTS

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Applicant has identified herein one or more important drawbacks of optical image delivery systems that are used in virtual reality and augmented reality display, such as but not limited to head mounted displays, including near to eye displays, and head up displays.

One such drawback is the undesirable effect of the so called optical vergence-accommodation conflict. Vergence is the simultaneous movement of both eyes in opposite directions to obtain or maintain single binocular vision. Vergence movements are closely connected to accommodation of the eye. Accommodation is the process by which the vertebrate eye changes optical power to maintain a clear image or focus on an object as its distance varies. Under normal conditions, changing the focus of the eyes to look at an object at a different distance will automatically cause vergence and accommodation.

The so called vergence-accommodation optical conflict effect is a result of the display screen creating the virtual image at a fixed optical distance from the observer yet the observer's eyes automatically adjusting their optical focus based on the perceived distance to objects they are looking at in the virtual image and/or the real world scene. In augmented reality displays, the conflict is a result of simultaneously viewing a virtual image located at a finite focal distance that does not correspond with the real-world focal distance for a given vergence angle.

Figure 1B:
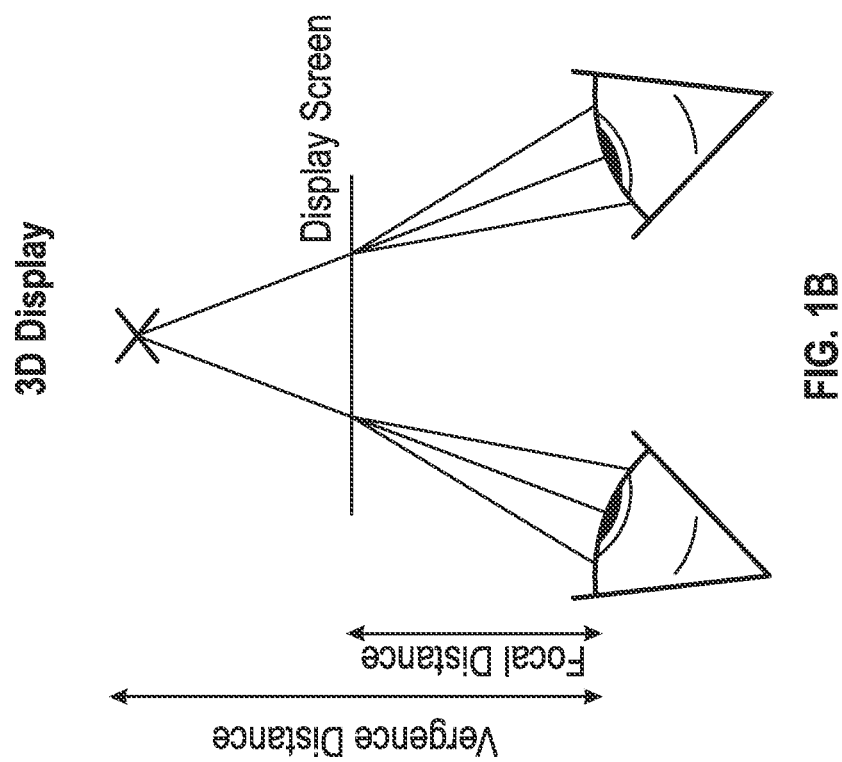
FIG. 1B is a schematic ray diagram illustrating optical convergence-accommodation mismatch associated with conventional optical systems used in augmented reality systems and virtual reality systems.
Figure 1A:
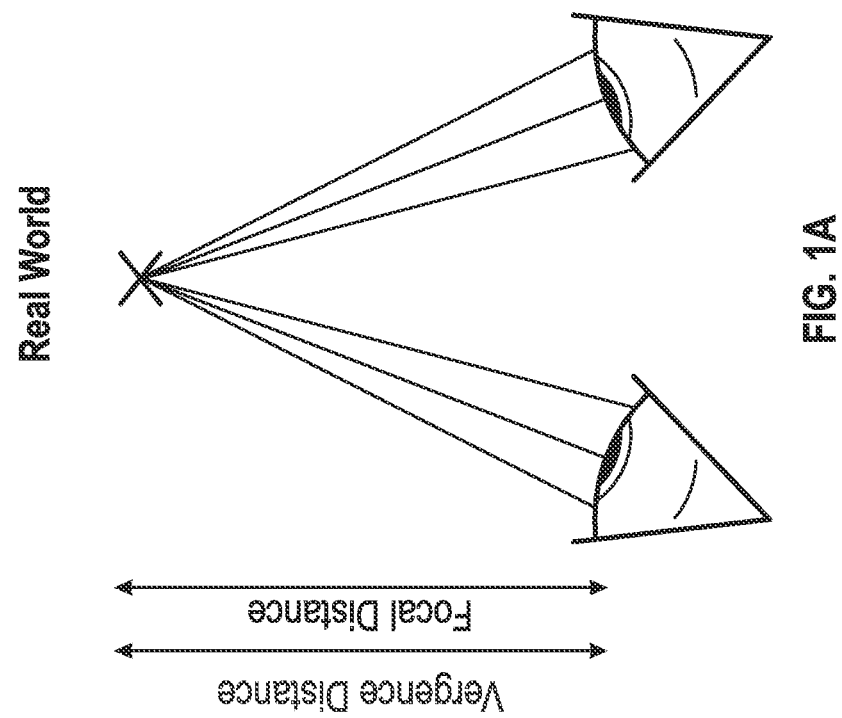
FIG. 1A is a schematic ray diagram illustrating matched optical convergence and accommodation of human eyes observing a real world scene.

FIGS. 1A and 1B are schematics generally illustrating optical convergence-accommodation mismatch problems associated with conventional optical systems used in augmented reality systems and virtual reality systems. In real world viewing vergence and accommodation work together without conflict as shown by way of example in FIG. 1A in which the vergence distance/plane and the focal distance/plane are compatible, i.e. the human eyes are rotated to aim or fix on the real world scene and have adapted to maintain the real world image in focus. In augmented reality displays, and also in virtual reality displays, when the focal plane is fixed, the display can easily emulate the vergence component of a different focal plane, but not the accommodation component. Hence there is a conflict between the two.

By way of example in FIG. 1B, an optical display generates a 3D virtual image of an object that is perceived by the eyes to be at the same distance as the real word scene in FIG. 1A. The human eyes automatically rotate and aim at the virtual image of the object based on the distance of the object being perceived as being beyond the display screen so that the vergence component remains unchanged compared to that shown in FIG. 1A. However, the human eyes naturally adapt to maintain the 3D virtual image in focus at a focal plane of the display screen itself that is significantly less than the vergence distance. Similar conflicts occur when the display generates a virtual image of an object that is perceived to be closer to the human eyes than the actual focal plane of the display screen. The vergence-accommodation conflict can lead to double vision, reduced visual clarity, visual discomfort, and fatigue [see the following articles: Kooi, F. L. and Toet, A. "Visual comfort of binocular and 3D displays." Displays, 25, 99-108. doi:10.1016/j.displays.2004.07.004; Lambooij et al. "Visual Discomfort and Visual Fatigue of Stereoscopic Displays: A Review, Journal of Imaging Science and Technology® 53(3): 030201-030201-14, 2009; and Shibata T, Kim J, Hoffman D M, Banks M S, "The zone of comfort: Predicting visual discomfort with stereo displays." Vis. 2011 Jul. 21; 11(8):11. doi: 10.1167/11.8.11; each of which is incorporated herein by reference.

As a result of the vergence-accommodation conflict, binocular augmented reality systems struggle to produce convincing 3-Dimensional imagery as the angular discrepancy between images sent to the left and right eye (convergence)

that conveys an objects distance does not match the depth at which the eye has to focus to form a sharp image (accommodation).

One technical method to address vergence-accommodation conflict is to use Maxwellian viewports to produce a focus free display, where the image is in focus regardless of the position of the projected virtual image plane (see by way example U.S. patent application Ser. No. 16/214,142, filed Dec. 18, 2019 which is incorporated herein by reference). However, one of the trade-offs that must be made between the transmitted image of the outside world and the projected digital image is the brightness and uniformity of the overlaid images due to the unwanted visual patterns of the viewports. The visual pattern of the viewports is more predominant as the distance between the eye and the combiner is increased. For a fixed viewport configuration, the size of the viewport can be optimum for one set of brightness conditions only, however if the brightness of the outside world image or of the projected image changes then the user's eye pupil will automatically change accordingly. This in turn will compromise the optical performance of the display; It will increase the visibility of the unwanted visual pattern of the viewports, i.e. nonuniform display if the brightness increases and decrease the virtual projected image sharpness if the brightness decreases. Hence the performance of the AR/VR display will not be optimum.

The aforementioned optical problems can be mitigated by aspects of the present technology which allow for optical systems and methods that provide improved optical delivery over known virtual reality and/or augmented display systems.

As will be explained in more detail below with reference to different aspects and embodiments of the present technology, optical adaptive viewports are provided which can be used in an augmented reality or virtual reality display system to allow for a reduction in the vergence and accommodation optical conflict. Optical adaptive viewports can be employed by the systems to manipulate convergence in displays so as to allow the eyes accommodation to more closely match the convergence.

Technical features described in this application can be used to construct various embodiments of optical systems and methods for augmented and/or virtual reality systems.

As a general approach, optical display systems for augmented and/or virtual reality systems are configured to relay the pupil of an image projection system directly onto a human eye or other lens-detector. The optical display system has an adaptive pupil device that is configured to control selection of a position and size of a sub pupil of the projection system. The selected sub-pupil is relayed to the human eye, or other lens-detector, so that the virtual image of the projected image is viewed by the human eye, or other lens-detector, through a single viewport to produce an image in focus beyond the hyperfocal distance. The resulting optical system, referred to herein as an optical adaptive viewport display system, uses a single hyperfocal viewport to deliver an image to the eye extending the focal accommodation range beyond that of the source image. The hyperfocal adaptive viewport of the system reduces the optical effects of vergence-convergence conflicts by allowing the accommodation plane to move towards the convergence plane and maintain a sharp image.

Systems and methods according to aspects of the present technology will now be described in more detail for use in some exemplary augmented reality and virtual reality display systems. However, it will be appreciated that in some other aspects and embodiments, the present technology can be configured for augmented reality and/or virtual reality systems other than those shown in the examples and even for other types of optical delivery systems that employ an adaptive pupil device that is configured to control a position and the size of a sub pupil of the projection system and relay to the human eye or other lens-detector so that the virtual image of the projected image is viewable by the human eye or other lens-detector through a single viewport and is hyperfocused.

In some embodiments, the optical adaptive viewport display system comprises an adaptive pupil device that is configurable to control the position and size of a sub pupil of the projection system. The adaptive display device may be positioned at the pupil of the image projector. Relay optics may be arranged to relay the image spot beam from the sub-pupil of the adaptive pupil device to an optical combiner, such as but not limited to a free space optical combiner. The optical combiner may be configured to reflectively project the image spot beam defined by the sub-pupil as a hyperfocal spot beam to the target area of a lens-detector system, (such as the human eye). The adaptive pupil device is configured to position and size the sub pupil so that the optical spot beam which is optically reflectively projected by the optical combiner on to a lens-detector system, or a target area in which the lens-detector system is to be placed, is a single hyperfocal spot beam for forming a hyperfocused image display view at the target area. The target area is defined herein to mean an area covering possible display viewing locations of a lens-detector system for viewing the projected display image. The lens-detector system, or the target area in which the lens-detector system is to be placed for viewing the projected display image, is located at predetermined working distance from the optical combiner.

In some approaches, the lens-detector system is a human eye. In other approaches, the lens-detector system comprises any optical lens-detector device. In some embodiments of the optical lens-detector device, the optical lens-detector device is an optical lens or lens assembly coupled to a sensor device, such as a digital or analog sensor. In some embodiments, optical the lens-detector device is a camera system. Furthermore, it will be understood that whilst in some embodiments described herein reference is made to a human eye and components thereof, the lens-detector system may instead be another type of system, such as for example any of the aforementioned optical-lens detector devices. Yet furthermore, it will be understood that whilst in some embodiments described herein reference is made to an optical lens-detector device, the lens-detector device may in other embodiments be instead a human eye system.

Figure 6:
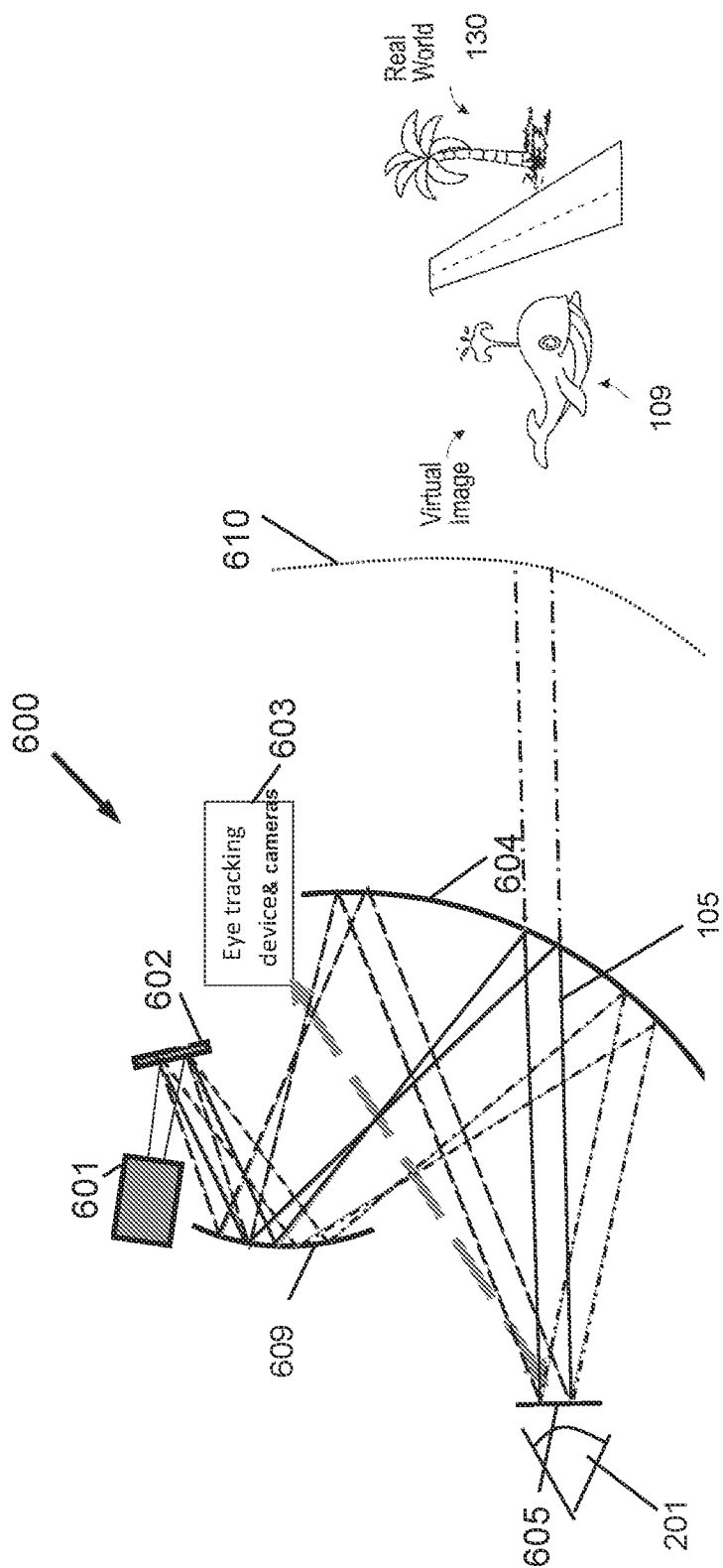
FIG. 6 is a schematic of an adaptive viewport display system according to an embodiment.

Reference will now be made in more detail to the adaptive viewport display systems according to some embodiments with reference to FIG. 6. An optical adaptive viewport display system 600 has an adaptive pupil device 602 optically coupled via a relay optic 603 to a free space optical combiner 604. System 600 may include an image projector 601 and eye tracking device 603. System 600 is used where the pupil of a projection system is relayed directly onto the eye positioned in the eye motion box 605 with some magnification or de-magnification, so the distance between the eye and the viewport is practically nil. The projected virtual image 109 is viewed through a single viewport 606 to produce an image in focus beyond the hyperfocal distance. Also, the adaptive pupil device 602, which may be a digital display device, is located at the pupil of the projection system, where the size and the position of the sub-pupil 607 can be controlled as illustrated by FIG. 6. This in turn allows the adjustment of the relayed viewport on the eye.

In some embodiments, eye tracking and eye pupil size sensing can be used to define the size of the relayed viewport. The size of the eye pupil will change depending on the brightness conditions of both outside world and projected images and the viewport can adapt to these varying conditions instantly. In some embodiments, the adaptive viewport can also be configured to introduce optical power to the system, so that the location of the projected image can be varied to produce multiple focal planes. Optical aberrations of the optical system and/or user eyesight can also be corrected using the proposed technique.

In some embodiments, a micro display panel such MEMS, DMD or LCoS can be used at the pupil of the projector to select a sub-area of the pupil which is then relayed on the user's pupil using a set of optics as illustrated as a way of example in FIGS. 7 to 10.

Eye tracking device 603 is used to monitor the gaze angle and the size of the pupil of the user's eye. The information from the eye tracker is then used to select the corresponding sub-pupil size and position at the adaptive pupil device.

Figure 7:
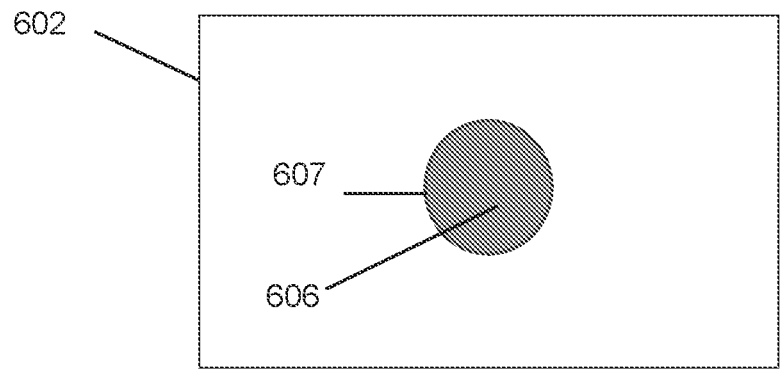
FIG. 7 is illustrates a view of the adaptive pupil device for which a sub aperture position and size has been selected on the adaptive pupil device for on-axis eye gaze angle according to an embodiment.
Figure 8:
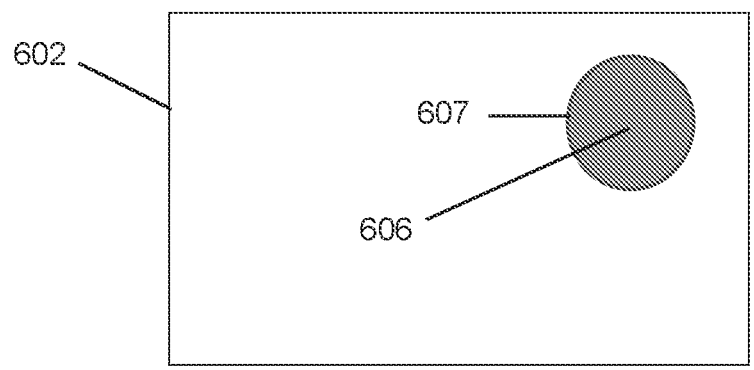
FIG. 8 is illustrates a view of the adaptive pupil device for which a sub aperture position and size has been selected on the adaptive pupil device for off-axis eye gaze angle according to an embodiment.
Figure 9:
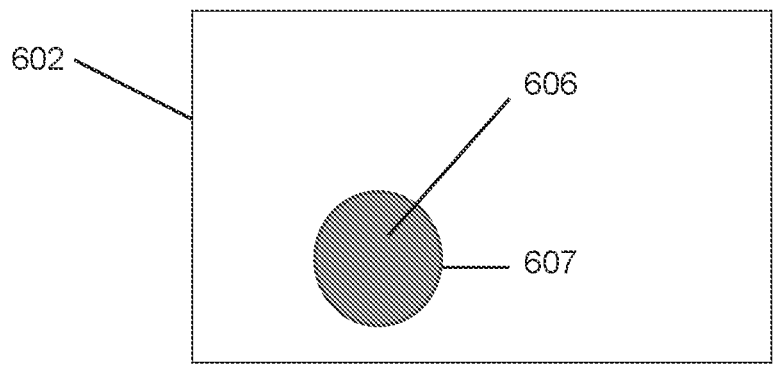
FIG. 9 is illustrates a view of the adaptive pupil device for which a sub aperture position and size has been selected on the adaptive pupil device for another off-axis eye gaze angle according to an embodiment.

FIGS. 7-10 illustrate the sub aperture position and size on the adaptive pupil device for on-axis and off-axis eye gaze angles as way of example. In a normal configuration, the on axis viewing angle should correspond to the sub-pupil position which is centered on the adaptive pupil device as shown in FIG. 7. The size of the sub-aperture will be determined by the eye tracking device according to the brightness conditions. FIGS. 8 and 9 are respective illustrations of the adaptive pupil device for two separate off-axis gazing angles.

With some micro display implementations, such as MEMS the projected image beam can also be steered if required. Other means of focal plane adjustment or vision correction may be implemented.

Figure 12:
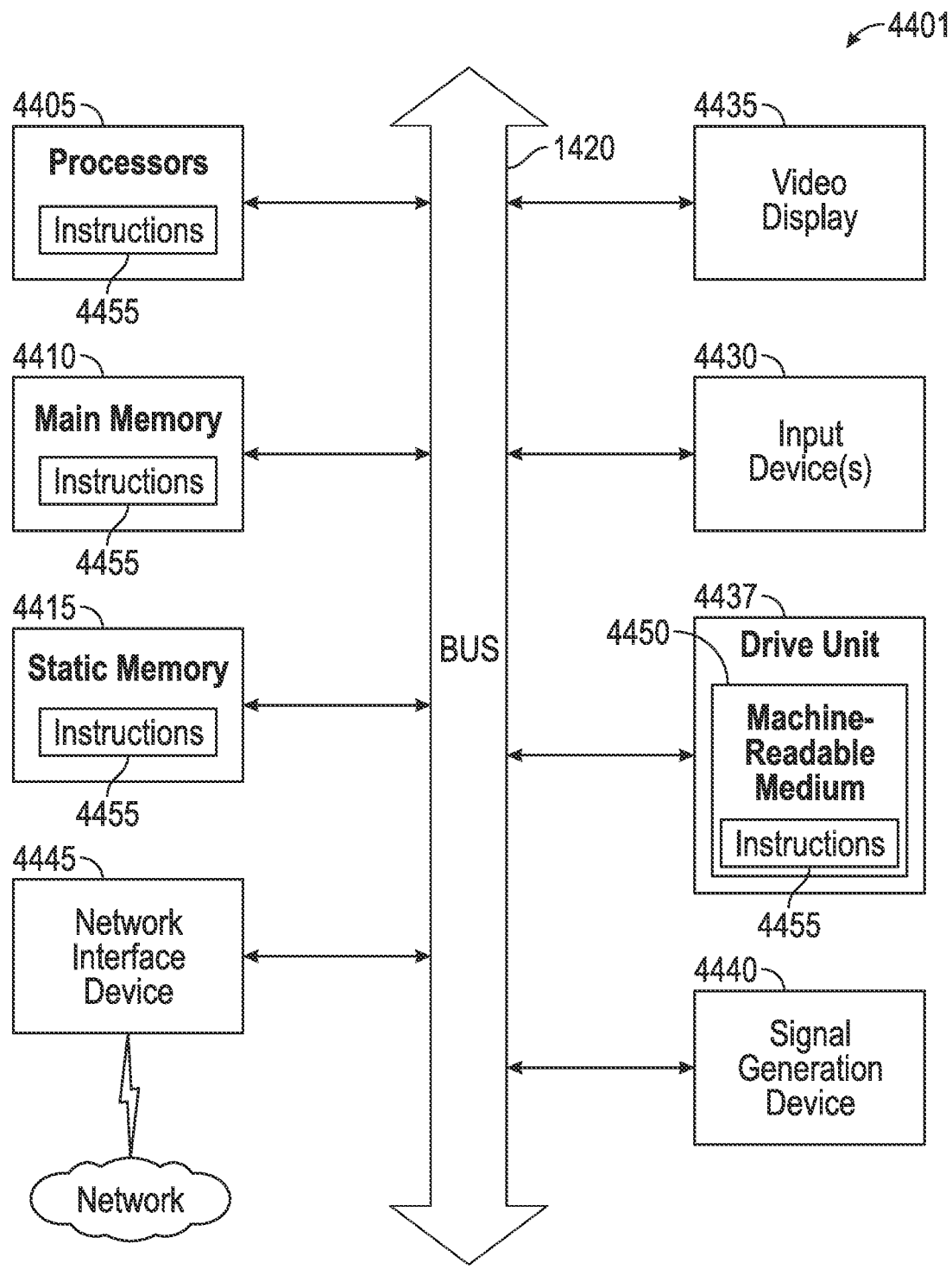
FIG. 12 is a diagrammatic representation of an exemplary machine in the form of a computer system for use in the adaptive viewport display system according to some embodiments.

One or more processors such as those described in relation to FIG. 12 are included in or operably coupled with the adaptive pupil device 602, and the eye tracking and sensing device 603. Eye tracking device 603 is operably coupled to adaptive pupil device 602. By way of example, eye tracking device 603 may be wireless or wired connected to adaptive pupil device 602. Eye tracking can be performed either by direct-view on indirect-view. In the former case, a mini wide-viewing angle camera module is positioned near the display to look directly at the eye. With indirect viewing, the display or another immediate surface may be incorporated with a reflective holographic or diffractive layer in the NIR region (number of companies such as 3M have developed similar, working on holographic films) that allows the image of the eye to be reflected to the mini wide-viewing-angle camera module. In both cases illumination can be provided by the display surface, either in visible or NIR wavelength regions. Further details can be found in U.S. patent application Ser. No. 16/214,142, filed Dec. 18, 2019 which is incorporated herein by reference.

Free space combiner 604 is see through and configured to reflectively deliver the virtual image 109 about the virtual image plane 610 and overlaying the real world 130 being observed by the human eye of the observer of the display system. In some embodiments, the free space combiners may be non-see through for virtual reality applications. Optical combiner 604 is a curved concave mirror optical combiner as shown in FIG. 6. The optical combiner is a partial mirror reflector (see through) but may be a full mirror (non-see through). The relay optics includes a curved reflector 609 which is configured to optically couple the adaptive pupil device output to the optical combiner 604. Optical combiner 604 may be a free-form combiner. Other relay optics may be employed which can be configured to optically relay the sub-pupil from the adaptive pupil device to the eye, or other lens-detector in the manner required to achieve hyperfocus of the virtual image. By way of example, other reflective optical combiners may be adopted together with the appropriate relay optics such as but not limited to flat reflective combiners, cascade prism/mirror combiners, arrayed reflectors, TIR free form surfaces with see through correctors, on and off axis reflective lenses etc.

According to one aspect, a method of operation of the optical adaptive viewport display system 600 is provided. A sub-area of the pupil of the projection system is selected by the adaptive pupil device 602 located at the pupil of a projector 601, to thereby provide a sub-pupil 607 of the projection system. The selected sub-pupil is then relayed, by optics 609 and optical combiner 604 arranged in optical communication between the digital display device and an eye box, to the eye box 605. The sub pupil 607 is selected by the adaptive pupil device by selecting the size and position of the sub-pupil projections system on the digital display panel of the adaptive pupil device 602 such that the sub-pupil relayed to the eyebox corresponds to a single viewport through which a virtual image projected from the projector system is viewable in focus beyond the hyperfocal distance by a user's eye at the eyebox 605. The optical method of operation may further comprise monitoring, by the eye tracking and sensing device 603, the gaze angle and pupil size of the user's eye at the eyebox 605. The optical method may further comprise the adaptive pupil device dynamically selecting the corresponding size and position of the sub-pupil of the projection system in response to receiving signals from the eye tracking and sensing device 603 corresponding to the gaze angle and eye pupil size such that the projected virtual image remains viewable in hyperfocus through the single viewport by the user's eye as the eye gaze angle and eye pupil size changes.

Adaptive pupil device 602 is configured to provide an image spot sized to form a virtual image hyperfocal image spot beam with an aperture diameter D at the target area for an eye or other lens-detector system so that the spot beam forms a single view, as seen by the lens-detector system, of the virtual display image that is hyperfocused. The size of the virtual image hyperfocal spot at the target area is the effective (not actual) aperture size of the lens-detector system that causes a hyperfocused view of the virtual display image as seen by the lens-detector system when the lens-detector system is placed in the target area. For a lens-detector system, the effective aperture therefore corresponds to the cross section of the virtual image spot beam portion of virtual image forming rays passing into the lens to render a real image optical spot, known as the circle of confusion, on the detector of the lens-detector system. As will be explained in more detail below, the virtual image spot size is much smaller than the lens of the lens-detector system to stop rays down to provide a circle of confusion that is of similar size to the lens-detector system, accounting for the working distance of the optical combiner from the lens detectors system.

Figure 2:
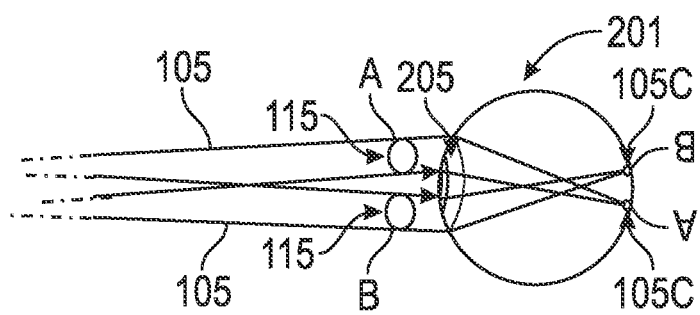
FIG. 2 is a conceptual diagram of an optical hyperfocal system according to an embodiment of the present technology.

Reference will now be made to FIGS. 2-5, for the purpose of explaining how the position and size of the sub-pupil 607 is determined so that the optical combiner reflects a hyperfocal spot beam 105 onto the eye, or other lens, to provide the hyperfocused view of the virtual image through the single viewport. FIG. 2 is a conceptual diagram showing a partial view of different spot beams relayed from optical combiner 604 in FIG. 6 to the eye according to an embodiment of the present technology. For ease of illustration and explanation, elements shown in FIG. 2 and in the other accompany figures herein are not drawn to scale. As mentioned hereinbefore, in some embodiments other types of optical lens-detector system may be used other than the human eye.

Optical ray bundles 105 reflected from the optical combiner are effectively a virtual image spot beam. Virtual image forming rays in the form spot beam 105 pass through viewing lens aperture 115 into the eye lens 205 to render a real image optical spot 105C, known as the circle of confusion, on the eye retina.

In optics, a circle of confusion is an optical spot caused by a cone of light rays from a lens not coming to a perfect focus when imaging a point source. It is also known as disk of confusion, circle of indistinctness, blur circle, or blur spot. The circle of confusion of the human eye is the optical spot caused by the cone of light rays from the eye lens not coming to a perfect focus on the eye retina. For a further explanation of Circle of confusion for the human eye, see for example Ray, Sidney F. 2000, including page 52, in The Manual of Photography: Photographic and Digital Imaging, 9th ed. Ed. Ralph E. Jacobson, Sidney F. Ray, Geoffrey G. Atteridge, and Norman R. Axford. Oxford: Focal Press. ISBN 0-240-51574-9 the entire contents of which is incorporated herein by reference.

FIG. 2. Illustrates an example of how two different letters "A" and "B" projected at infinity and subtending different angles would be focused at the back of the retina. In each case, a separate Circle of confusion (CoC) is formed. A CoC forms the basis of the point spread function of an imaging system, and are convolved with each part of the image. The CoC is the blur spot that is convolved with the scene, and makes differences in focus appear indistinguishable within the hyper focal distance range as will be explained in more detail below.

Optical image beam 105 is sized such that the spot beam cross sectional diameter is sufficiently small that the eyelens or other lens-detector system is hyperfocused, that is, eyelens 205 is focusable from a desired distance (H) all the way to infinity whilst maintaining an acceptably sharp image without changing the image plane location.

For the purpose of explaining how the optical spot beam 105 is configured to provide hyperfocus, reference is made to FIGS. 3 and 4 which are simple geometric optical ray diagrams illustrating how circles of confusion rendered on an detector device 402 of a lens-detector system 400 can be adjusted. Lens-detector system 400 comprises a viewing lens 401 optically coupled to the optical sensor detector 402. In some embodiments, an optical viewing lens assembly may be used instead of a single lens 401. Optical sensor detector 402 is for example a CCD or CMOS image sensor. Such sensors may in some embodiments employ a rolling shutter or a global shutter. In FIG. 3, optical rays 305 come from a point source at infinity and optical rays 306 come from an arbitrary distance H. The infinity rays 305 focus at the focal length f of the lens 401. The rays 306 from H focus at point f'. At the point f' the rays 305 from infinity have expanded past their ideal focal point and will subtend an area known as the Circle of confusion (CoC). If the smallest resolvable point on the detector 402 is greater than the CoC then the detector will not be able to differentiate between the rays originating from infinity and those originating from H. Both images will appear acceptably sharp.

As can be seen by comparing FIG. 3, with FIG. 4, the CoC diameter can be adjusted by reducing the effective aperture D to the desired size. In FIG. 4, the rays 307 originating from infinity pass through an effective lens aperture with a reduced diameter D compared to the effective aperture shown in FIG. 3. Similarly, using the same principle, by projecting the discrete spot beam 105 of diameter D corresponding to the eye lens hyperfocal aperture on eye lens 205, the effective lens aperture of the human eye is adjusted so that the human eye in FIG. 2 is not able to differentiate between the reflected optical rays 105 relayed to the eye and those originating from H, the hyperfocal distance. This is the fundamental definition for the Hyperfocal viewport.

For the lens-detector system shown in FIG. 4, the modified viewing lens aperture D therefore corresponds to the cross sectional diameter D of the discrete spot beam portion of image forming rays 307 passing into viewing lens 401 to render a real image optical spot, the circle of confusion, (CoC') on detector 402 of lens-detector system. In a similar manner, as shown in FIG. 2, reflected discrete spot beam portion of virtual image forming rays 105 pass into the eye lens 205 to render a real image optical spot 105C, the circle of confusion, on the eye retina. A hyperfocal view port is much smaller than the eyelens 205 to effectively stop virtual image forming rays down to provide a circle of confusion that is of similar size to eye lens 205, accounting for the working distance of the optical combiner from the eye lens.

The size of the modified viewing lens aperture at the target area for a lens-detector system is therefore the effective (not actual) aperture size of the lens-detector system that is smaller than the actual aperture diameter of the viewing lens and that causes a hyperfocused view of the virtual display portion as seen by the lens-detector system when the lens-detector system is placed in the target area.

Hyperfocal distance has different definitions to a person of ordinary skill in the art. One such definition of the hyperfocal distance is the closest distance at which a lens can be focused while keeping objects at infinity acceptably sharp. When the lens is focused at this distance, all objects at distances from half of the hyperfocal distance out to infinity will be acceptably sharp. Another definition is the hyperfocal distance is the distance beyond which all objects are acceptably sharp, for a lens focused at infinity. Both definitions are congruent. Hyperfocus allows a lens to be focused from a desired distance (H), all the way to infinity whilst maintaining an acceptably sharp image without changing the image plane location. For the avoidance of doubt, this application refers to hyperfocal distance with reference to the present technology as meaning the desired distance H, that is, the hyperfocus allows a viewing lens [such as but not limited to the human eye lens] to be focused from the hyperfocal distance (H), all the way to infinity whilst maintaining an acceptably sharp image without changing the virtual image plane location.

The definition of an "acceptably sharp image" is predetermined according to the optical specification of the system. In some embodiments, acceptably sharp image means an image with a level of sharpness that is predetermined according to standard values of average human eye performance. In some embodiments, acceptably sharp image means an image with a level of sharpness that is being predetermined according to a human eye performance of an individual. In some embodiments, acceptably sharp image means an image with a level of sharpness that is predetermined according to the resolution of an optical detector device (non-human). In yet some other embodiments, acceptably sharp image means an image with a level of sharpness that is in accordance to the Nyquist criterion—the circle of confusion should be half the size of the smallest resolvable feature on the display. This would be determined according to the smallest resolvable feature of the lens-detector system. For a lens-detector system being a human eye system, if the display is capable of showing image features below the smallest resolvable feature of the human eye, as per standard accepted values of average human eye performance, then clearly the resolution of the eye is the limit of acceptable sharpness. For the sake of clarity, acceptably sharp as referred to hereinafter means an image with at least a level of sharpness that is in accordance to the Nyquist criterion—the circle of confusion should be half the size of the smallest resolvable feature on the display. However, acceptably sharp may be defined according to any one of the other aforementioned definitions of acceptably sharp.

The equation that describes hyperfocal distance is given by:

$$H = \frac{(D+c)f}{c} \qquad (1)$$

H is the hyperfocal distance, the aperture diameter D is the ratio of the focal length f to the F-number N; and c is the diameter of the circle of confusion.
Therefore $$H = \frac{(f/N + c)f}{c} = \frac{f^2}{Nc} + f \qquad (2)$$

(for derivation see for example Photography for students of physics and chemistry by Derr, Louis, 1868-1923, including Pages 78 & 79, and appendix, Publication date 1906, Publisher New York, The Macmillan Company; London, Macmillan & Co., ltd. the entire contents of which is incorporated herein by reference).
Given the F-number is $$N = \frac{f}{D} \qquad (3)$$

Hence we see that the Hyperfocal distance is directly proportional to both f and D:

$$H = \frac{fD}{c} + f \qquad (4)$$

Examples of values of the circle of confusion for the human eye and the relationship with hyperfocal distance based on empirical data have been provided (see for example Ray, Sidney F. 2000, including page 52, in The Manual of Photography: Photographic and Digital Imaging, 9th ed. Ed. Ralph E. Jacobson, Sidney F. Ray, Geoffrey G. Atteridge, and Norman R. Axford. Oxford: Focal Press. ISBN 0-240-51574-9 the entire contents of which is incorporated herein by reference). The following example is given by the aforementioned Ray Sidney reference:
"Normal vision requires muscular action to alter the refractive state of the eye in order to focus. This internal focusing is called accommodation, and physiological limitations set a comfortable near distance of distinct vision (Dv) of some 250 mm . . . . For example, in ideal conditions a high-contrast line of width 0.075 mm can be perceived at Dv subtending an angle of approximately 1 minute of arc, and representing an image on the retina of the eye of some 5 micrometres in width . . . . The limiting performance is seldom achieved, and a lower value of 0.1 mm line width at Dv is commonly adopted. Converted into resolving power, an acuity of 0.1 mm corresponds to a spatial cycle of 0.2 mm, being the width of the line plus an adjacent identical space such as is used on a bar-type resolution test target, giving a value of 5 cycles per mm for the average eye."

The aperture diameter D is determined using the above equations (1) to (4). Rearranging equation (3) to (4) gives equation (5) below for determining D the diameter of the effective aperture of the eye lens for a predetermined hyperfocal distance H and circle of confusion c. Diameter D is the required diameter of the discrete spot beam 105 at the eye lens shown in FIGS. 2 and 6, which in turn determines the corresponding the size of the sub-pupil 607.

In some embodiments, the predetermined hyperfocal distance H for the system is a comfortable near distance of distinct vision of the human eye. In such as case, the aperture diameter D (which is the diameter of the reflected discrete spot beam at the viewing lens) is determined from equations (3) and (4) with a hyperfocal distance H equal to a comfortable near distance of distinct view of the human eye and a known circle of confusion c for that hyperfocal distance H. In some embodiments, alternatively or additionally, the hyperfocal distance H is set with a view to maintaining a net reflectivity of the optical image input rays to provide a required display efficiency.

By way of non-limiting example, when focusing at infinity the focal length of the eye lens is approximately 16 mm. When focusing at the hyperfocal distance of 0.25 m the focal length f of the eye is approximately 15.04 mm. The circle of confusion according to the empirical treatment set forth in the aforementioned reference of Ray, Sidney F. 2000 is approximately 13.3 microns for 0.2 mm spatial cycle. From the diameter of the aperture in front of the eye to give retinal resolution limited focus from 0.25 m to infinity is as follows:

$$D = \frac{(H-f)c}{f} = \frac{(0.25 - 15.04 \times 10^{-3})13.3 \times 10^{-6}}{(15.04 \times 10^{-3})}m = 2.1 \times 10^{-4}m \qquad (5)$$

Hence, in the aforementioned example, the aperture diameter D corresponds to the ideal pupil diameter for hyper focus from infinity to 0.25 m is 210 microns on the eye lens. The sub pupil 607 is configured with the same or substantially the same aperture diameter. Since rays 105 are substantially parallel, the combiner projects a substantially similar size discrete spot of reflected rays on the eye lens. For some free space optical combiners or other combiner, rays 105 may be parallel or substantially parallel whilst in some other embodiments, they may be diverging away from the optical combiner rather than being parallel and in which case the discrete spot diameter D at the viewing lens may be larger than the image spot at the optical combiner but can be determined by simple geometry.

The aforementioned example illustrates how to determine the aperture diameter or size of the sub pupil 607 for a given hyperfocal distance and relay optics. It would be appreciated that the pupil diameter for hyperfocus on the eye lens may be calculated using other empirical data and is not limited to the specific values set forth in the aforementioned reference of Ray, Sidney F.

In some embodiments, the angular resolution of a head mounted display or near eye display, or other display system incorporating the optical adaptive pupil system of any one of the embodiments, combined with Nyquist criterion is used to determine the dimensions of the circle of confusion. The circle of confusion is predetermined to be half the size of the smallest resolvable feature on the displayed image at the exit pupil of display system. In some embodiments, the circle of confusion is predetermined to be less than half the size of the smallest resolvable feature.

The position and reflector characteristics of the optical combiner are selected so that the vergence plane 140 is in a range from H to infinity and is used to determine the plane that is most comfortable to accommodate at to maintain an acceptably sharp image. Each eye is able to accommodate, in a range from infinity down to a hyperfocal distance of the eye lens, a virtual image formed by the discrete optical spot beam 105 without any loss of resolution of the virtual image spot. To this end, diameter D of the discrete spot beam 105 at the viewing lens is determined using the above mentioned procedures for calculating D. In turn, the selected size of the aperture of the sub pupil 607 is determined based on the calculated D taking into account any adjustments for changes caused by the relay optics. For example, in embodiments in which the reflected spot beam is diverging rather than strictly parallel, the divergence of the beam is also to be taken into account to determine the sub pupil size from D by considering the distance between the combiner and the eye and the angle of divergence.

In some embodiments, the size of the sub pupil 607 is selected so that the projected discrete spot beam at the eye lens has a diameter that is equal to the calculated diameter D. In some other embodiments, the size of the sub pupil 607 is selected so that the projected discrete spot beam at the eye lens has a diameter less than diameter D.

Figure 5:
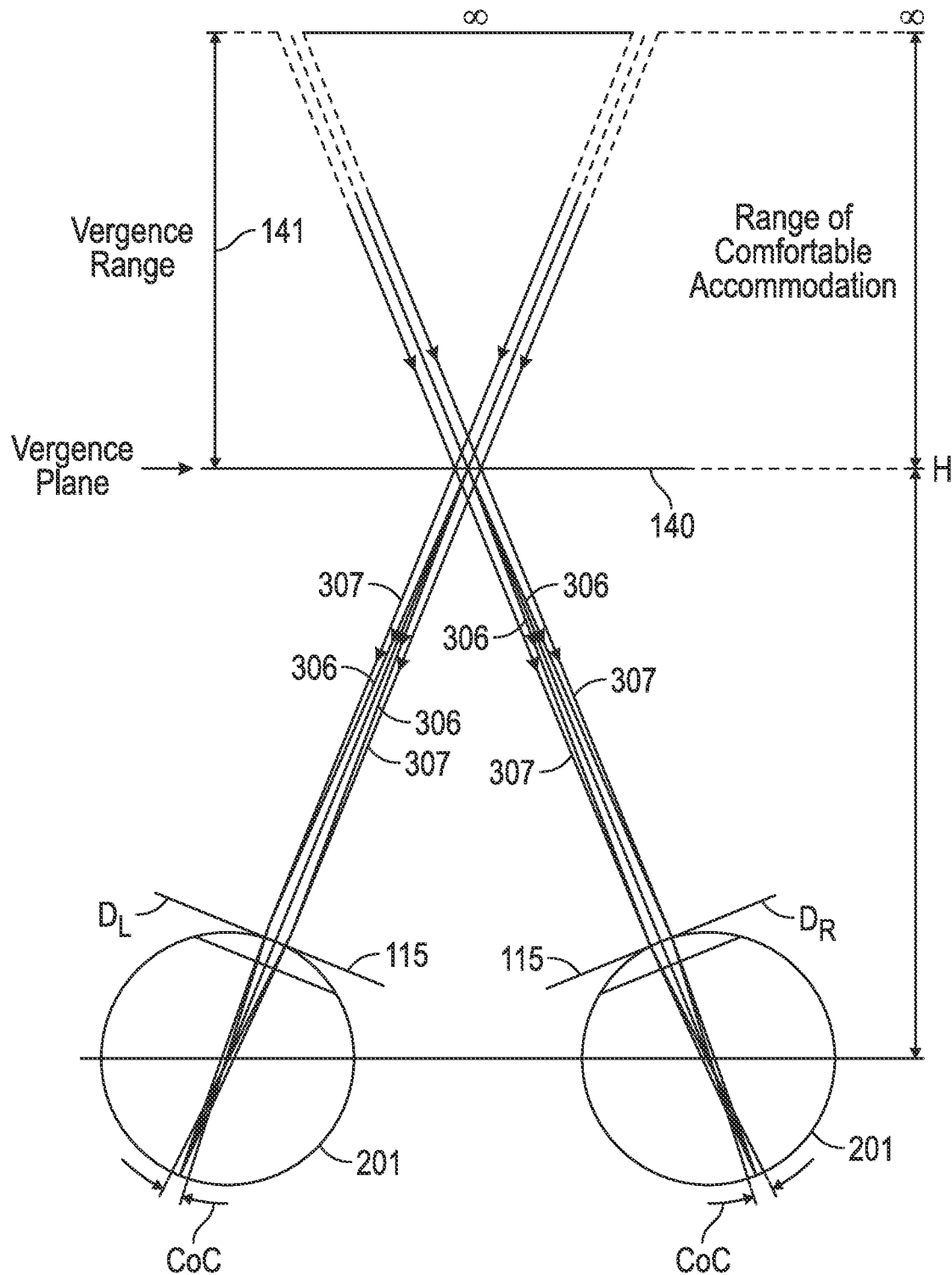
FIG. 5 illustrates how hyperfocal apertures in a binocular configuration at the entrance of the pupils of the eyes provide an accommodation range from the hyperfocal distance (H) to infinity.

FIG. 5 illustrates hyperfocal apertures 115 with diameter (D) in a binocular configuration at the entrance of the pupils of the eyes 201 provide an accommodation range from the hyperfocal distance (H) to infinity. A vergence plane 140, that is, the plane at which the line of sight or visual axis of both eyes converge to maintain single binocular vision, can be selected in a vergence range 141 from H to infinity and used to determine the plane that is most comfortable to accommodate at to maintain an acceptably sharp virtual image. Since optical rays 307 originate from infinity, each hyperfocal aperture 115 is moveable further from the eye along the line of sight without altering the hyperfocal performance. In a similar manner, the sub pupil 607 relayed from the adaptive pupil device 602 acts as a hyperfocal aperture to a projected display image. The optical adaptive view port systems of FIG. 6 can therefore be configured in a binocular system in which the relay optics are arranged to provide a plane that is most comfortable to accommodate at to maintain an acceptably sharp virtual image.

Figure 10:
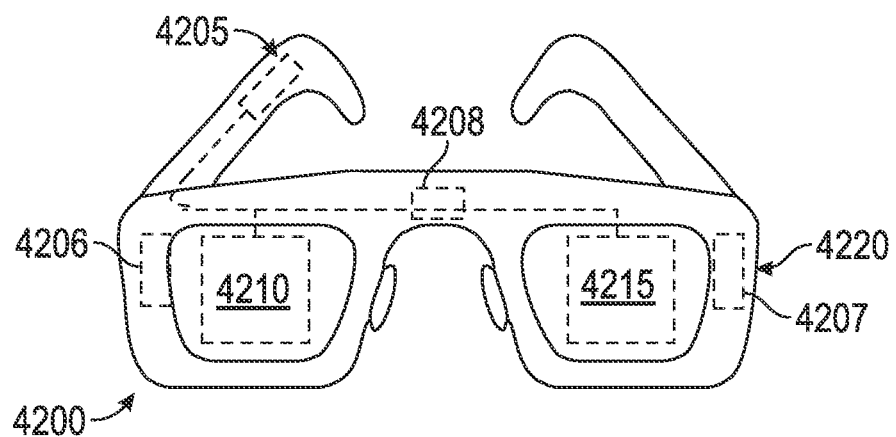
FIG. 10 is a simplified illustration of head mounted display glasses including the adaptive viewport display system according to an embodiment.

In some aspects, one or more of any of optical adaptive viewport display systems of the embodiments disclosed herein are incorporated in head mounted displays. In some embodiments, a pair of the optical adaptive view port display systems are included in glasses or other form factor augmented reality head mounted displays. FIG. 10 shows a front view of a pair of the head mounted display glasses according to one embodiment. Goggle type head mounted display or other type of glasses has a left eye optical adaptive view port system 4215 and a right eye optical adaptive viewport system 4210. The display image generating system is included in the head mounted display. The optical adaptive viewport display system may be any one of the optical adaptive viewport display systems of the embodiments described herein. The optical projector or other display image generating system used for the optical adaptive display system may include a processing module 4205 generating computer formed images for binocular view and an optical image projector 4206, 4207 and associated optical coupling for each eye. An opto-mechanical frame 4220 holds the optical parts securely and in the correct geometric alignment. In some embodiments, the formed images are for monocular view and only one of the optical adaptive viewport display systems and associated display image generating system is included in the head mounted display. The eye tracking system and camera control systems are also included (see 4208). In some embodiments the eye tracking system is omitted.

Figure 11:
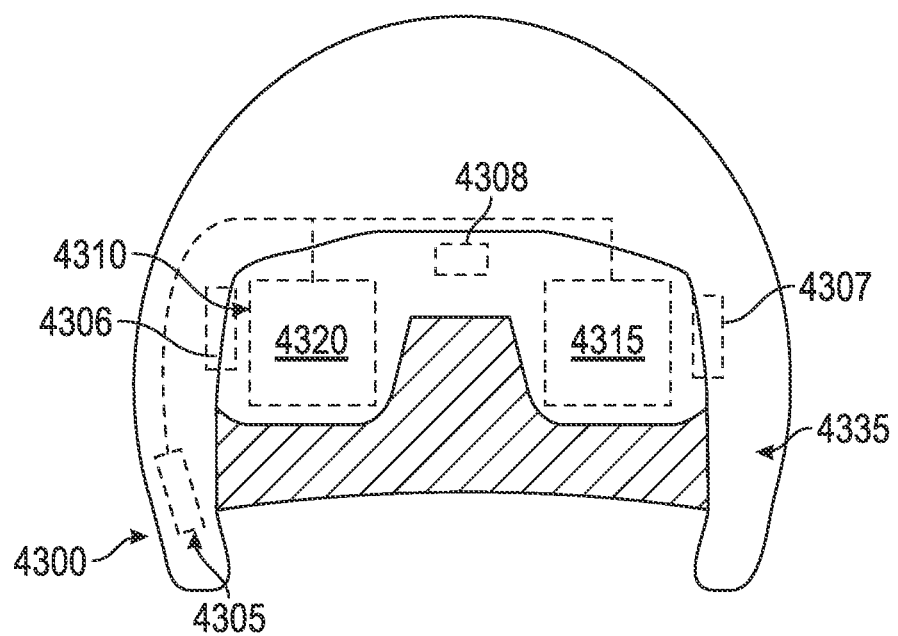
FIG. 11 is a simplified illustration of a head mounted display visor including adaptive viewport display system according to an embodiment.

In some embodiments, the head mounted display in which one or more of the optical combiners is incorporated is a helmet form factor augmented reality head mounted display. FIG. 11 shows a front view of a head mounted display helmet according to one embodiment. Helmet head mounted display has a processing module 4305 generating computer formed images for binocular view. A left eye optical adaptive viewport display system 4315 and display image generating system 4307 therefor and a right eye optical adaptive viewport display system 4320 and display image generating system 4306 therefor are included in the head mounted display. The optical adaptive viewport display system in each system may be any one of the optical adaptive viewport display systems of the embodiments described herein. Optical image projector and optical coupling may for example form part of the display image generating system. An opto-mechanical sub frame 4300 holds the optical parts securely and in the correct geometric alignment. Opto-mechanical sub frame is supported by a mechanically robust shell of the helmet. The eye tracking system including the eye tracking cameras are included (see 4308). The eye tracking system maybe any one of the eye tracking system of the embodiments described herein or another type of system. In some embodiments, the eye tracking system is omitted.

In other embodiments, the head mounted displays shown in FIGS. 10 and 11 may include other optical and electronic components such as but not limited to a depth sensor camera, color camera, microphone, speakers, input/output ports, battery and/or luminesce control and electro dark filters.

In some embodiments, the formed images are for monocular view and only one of the optical adaptive viewport systems and display image generating system is included in the head mounted display.

FIG. 12 is a diagrammatic representation of an embodiment of a machine in the form of a computer system 4401. In some embodiments, any one of the processors referred to in the aforementioned description of the embodiments of the optical systems may be one or more such computer systems, processors described with reference to FIG. 12 or similar systems. Within computer system 4401 is a set of instructions for causing the machine to perform any one or more of the methodologies discussed herein, including computer-implemented method steps used in performing any one or combination of display image generation, eye tracking including monitoring eye gaze and eye pupil size, adaptive pupil device control including controlling of sub-pupil size and position selection, and other processes, which may be executed and which may serve as the computing system of an augmented or virtual reality display incorporating in any one of the optical adaptive viewport display systems disclosed herein. In various example embodiments, the machine operates as a standalone device, may be connected (e.g., networked) to other machines or integrated in the head mounted display or head up display itself. In a networked deployment, the machine may operate in the capacity of a server or a client machine in a server-client network environment, or as a peer machine in a peer-to-peer (or distributed) network environment. The machine may be a robotic construction marking device, a base station, a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The embodiment of the computer system 4401 is includes a processor or multiple processors 4405 (e.g., a central processing unit (CPU), a graphics processing unit (GPU), or both), and a main memory 4410 and static memory 4415, which communicate with each other via a bus 4420. The computer system 4401 may further include a video display 4435 (e.g., a liquid crystal display (LCD)). The computer system 4401 may also include an alpha-numeric input device(s) 4430 (e.g., a keyboard), a cursor control device (e.g., a mouse), a voice recognition or biometric verification unit (not shown), a drive unit 4437 (also referred to as disk drive unit), a signal generation device 4440 (e.g., a speaker), and a network interface device 4445. The computer system 4401 may further include a data encryption module (not shown) to encrypt data.

The drive unit 4437 includes a computer or machine-readable medium 4450 on which is stored one or more sets of instructions and data structures (e.g., instructions 4455) embodying or utilizing any one or more of the methodologies or functions described herein. The instructions 4455 may also reside, completely or at least partially, within the main memory 4410 and/or within the processors 4405 during execution thereof by the computer system 4401. The main memory 4410 and the processors 4405 may also constitute machine-readable media.

The instructions 4455 may further be transmitted or received over a network via the network interface device 4445 utilizing any one of a number of well-known transfer protocols (e.g., Hyper Text Transfer Protocol (HTTP)). While the machine-readable medium 4450 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

Not all components of the computer system 4401 are required and thus portions of the computer system 4401 can be removed if not needed, such as Input/Output (I/O) devices (e.g., input device(s) 4430). One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

As used herein, the term "module" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality.

The computing machine may be implemented locally with and/or remotely from the eye tracking system and display image generating system. In some embodiments, the computing system serves as the eye tracking display image editing system and is located remotely. The eye tracking system and image generating display system are configured to wirelessly communicate with the computing system. In some embodiments, the remote computing system also provides some of the functionality for the purpose of generating computer images that would otherwise be performed by the image display generating system. In some embodiments at least a portion of the eye tracking display image editing system is a computing machine implemented locally on the head mounted display, such as in the form of one or more modules on the head mounted display.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The block diagrams in the Figures illustrate the architecture, functionality, and operation of possible implementations of systems, methods and computer program products according to various embodiments of the present technology. In this regard, the block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present. The description herein is illustrative and not restrictive. Many variations of the technology will become apparent to those of skill in the art upon review of this disclosure.

It will be appreciated that various of the above-disclosed and other features and functions, or alternatives thereof, may be desirably combined into many other different systems or applications such as head up type displays. Various presently unforeseen or unanticipated alternatives, modifications, variations, or improvements therein may be subsequently made by those skilled in the art which are also intended to be encompassed by the following claims. For example, the head mounted display sets may be visors, goggles or headband structures and are not limited to the particular types shown in the Figures. Likewise the shape of the optical combiner substrates may be any shape that is capable of guiding and combining images in the manner described hereinbefore.

The description of the present disclosure has been presented for purposes of illustration and description, but is not intended to be exhaustive or limited to the present disclosure in the form disclosed. Many modifications and variations will be apparent to those of ordinary skill in the art without departing from the scope and spirit of the present disclosure. Exemplary embodiments were chosen and described in order to best explain the principles of the present disclosure and its practical application, and to enable others of ordinary skill in the art to understand the present disclosure for various embodiments with various modifications as are suited to the particular use contemplated.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

The invention claimed is:

1. An optical display system that provides an adaptive viewport, the optical display system comprising:
   one or more processors configured to execute machine-executable components stored in memory;
   an eye tracking device configured to, alone or in combination with the one or more processors, monitor a gaze angle and a size of a pupil of a user's eye located at an eyebox of the optical display system;
   an adaptive pupil device located at a pupil of a projection system and configured to select, based on the gaze angle and the size of the pupil of the user's eye, a position and a size of a sub-pupil of the pupil of the projection system;
   and
   an optical combiner including relay optics configured to relay the sub-pupil of the pupil of the projection system to the eyebox, wherein the sub-pupil of the pupil of the projection system corresponds to the adaptive viewport through which a virtual image projected by the projection system is viewed by the user's eye as hyperfocused.

2. The optical display system of claim 1, wherein the optical combiner is at least a free space optical combiner, and wherein the optical combiner includes at least one of a partial mirror or a full mirror.

3. The optical display system of claim 1, wherein the adaptive pupil device comprises a digital display device that selects the size and the position of the sub-pupil of the pupil of the projection system in response to receiving information comprising the gaze angle and the size of the pupil of the user's eye from the eye tracking device.

4. The optical display system of claim 1, wherein the relay optics is configured to optically relay the sub-pupil of the pupil of the projection system from the adaptive pupil device to the optical combiner and from the optical combiner to the eyebox.

5. The optical display system of claim 1, wherein the optical display system comprises at least one of an augmented reality (AR) system or a virtual reality (VR) system.

6. The optical display system of claim 1, wherein:
   the optical display system includes a binocular system that includes a first optical display subsystem and a second optical display subsystem,
   the first optical display subsystem is configured for a left eye target area, and
   the second optical display subsystem is configured for a right eye target area.

7. The optical display system of claim 1, wherein the adaptive pupil device includes a digital display device, and wherein the digital display device comprises a micro-electrical-mechanical system (MEMS), a Digital Micromirror device (DMD), or a Liquid crystal on silicon (LCoS) display device.

8. The optical display system of claim 1, wherein the optical combiner comprises a flat reflective combiner, a cascade prism/mirror combiner, arrayed reflectors, total internal reflection (TIR) free form surfaces with see through correctors, or on and off axis reflective lenses.

9. An optical display method, comprising:
   monitoring a gaze angle and a pupil size of a lens-detector system located at an eyebox of an optical display system;
   selecting, by an adaptive pupil device and based on the gaze angle and the pupil size of the lens-detector system, a position and a size of a sub-pupil of a pupil of a projection system of the optical display system; and
   relaying, by relay optics of the optical display system, the sub-pupil of the pupil of the projection system to the eyebox, wherein the sub-pupil of the pupil of the projection system corresponds to an adaptive viewport through which a virtual image projected by the projection system is viewed by the lens-detector system as hyperfocused.

10. The optical display method of claim 9, wherein relaying the sub-pupil of the pupil of the projection system to the eyebox comprises:
    optically relaying the sub-pupil of the pupil of the projection system from the adaptive pupil device to an optical combiner and from the optical combiner to the eyebox.

11. The optical display method of claim 10, wherein the optical combiner is at least a free space optical combiner, and wherein the optical combiner includes at least one of a partial mirror or a full mirror.

12. The optical display method of claim 9, wherein the optical display system comprises at least one of an AR system or a VR system.

13. The optical display method of claim 9, wherein the lens-detector system is at least one of a human eye or an optical lens-detector device.

14. The optical display method of claim 9, further comprising:
    configuring, by the optical display system, a first optical display subsystem for a left eye target area, and a second optical display subsystem for a right eye target area for a binocular system.

15. The optical display method of claim 9, wherein selecting the position and the size of the sub-pupil of the pupil of the projection system comprises selecting the position and the size of the sub-pupil of the pupil of the projection system via a digital display device located at the pupil of the projection system.

16. A non-transitory machine-readable medium, comprising executable instructions that, when executed by one or more processors, facilitate performance of operations comprising:
   monitoring a gaze angle and a pupil size of a lens-detector system located at an eyebox of an optical display system;
   selecting, via an adaptive pupil device and based on the gaze angle and the pupil size of the lens-detector system, a position and a size of a sub-pupil of a pupil of a projection system; and
   relaying the sub-pupil of the pupil of the projection system to the eyebox, wherein the sub-pupil of the pupil of the projection system corresponds to an adaptive viewport through which a virtual image projected by the projection system is viewed by the lens-detector system as hyperfocused.

17. The non-transitory machine-readable medium of claim 16, wherein relaying the sub-pupil of the pupil of the projection system to the eyebox comprises:
   optically relaying the sub-pupil of the pupil of the projection system from the adaptive pupil device to an optical combiner and from the optical combiner to the eyebox.

18. The non-transitory machine-readable medium of claim 16, wherein the lens-detector system is at least one of a human eye or an optical lens-detector device.

19. The non-transitory machine-readable medium of claim 16, wherein selecting the position and the size of the sub-pupil of the pupil of the projection system comprises selecting the position and the size of the sub-pupil of the pupil of the projection system via a digital display device located at the pupil of the projection system.

20. The non-transitory machine-readable medium of claim 16, wherein the operations further comprise configuring, via the optical display system, a first optical display subsystem for a left eye target area and a second optical display subsystem for a right eye target area for a binocular system.

* * * * *